Patented Aug. 10, 1943

2,326,133

UNITED STATES PATENT OFFICE 2,326,133

METHOD OF MAKING CHEESE

Ernest D. Fear, Kansas City, Mo., assignor of thirty per cent to Irving E. Fear and twenty per cent to Helendoris Murphy, both of Kansas City, Mo.

No Drawing. Application March 6, 1940,
Serial No. 322,508

7 Claims. (Cl. 99—116)

My invention relates to a method of making cheese, and more particularly to a method of making hard cheeses such as Cheddar cheese and the like.

It has been the usual custom in the making of Cheddar cheese to permit the milk to develop an acidity between .19 and .21 percent before setting.

Many undesirable changes occur in milk containing milk fat. These changes produce an "off" taste in the milk variously termed "rancid," "tallowy," and "fishy."

Milk fat contains a relatively high percentage of the lower fatty acids. Upon slight hydrolysis of these, the result is splitting and the formation of aldehydes, acids, and ketones producing tallowy odors and flavors. The production of free fatty acids is due primarily to the hydrolytic action of enzymes or the action of free acids in the presence of water. This accelerating effect of free acids appears to be analogous to their action in the acid hydrolysis of sugars and is a function of the hydrogen ion concentration. The lower fatty acids such as butyric, caproic and the like, produced by hydrolysis, are responsible for the rancid odors and flavors.

The result of permitting the milk from which the cheese is to be made to develop the acidity, is that no two batches will be exactly alike. The result has been that cheese making has been considered an art to be learned by long practice, and in which the results obtained depend upon the judgment of the cheese maker.

I propose to reduce cheese making to a science so that uniformly excellent and standard results may be obtained every time.

One object of my invention is to provide a novel method of making cheese.

Another object of my invention is to provide a novel method of making a cheese of uniform excellence and standard taste.

Other and further objects of my invention will appear from the following description.

In the prior art, when the milk from which the cheese is to be made has developed the desired acidity, rennet is added in an amount from 2.25 to 4.00 ounces per thousand pounds of milk. The rennet is usually added in an aqueous solution to produce the desired coagulation.

According to my method, the milk is first pasteurized and then neutralized with either calcium oxide or magnesium oxide. It is to be understood, of course, that the pasteurization and neutralization steps may be conducted simultaneously.

Many attempts have been made to manufacture hard cheeses such as Cheddar cheese from pasteurized milk, but the results heretofore have been unsuccessful. The attempts have resulted in cheeses having imperfect body and lacking in flavor and they have been, further, very slow in ripening.

By means of my method, however, I am enabled to make an excellent cheese from pasteurized milk.

After the milk has been pasteurized and neutralized, I add in an amount of about 5 per cent of the total weight of the milk, a lactic acid producing starter. The starter is made from milk and has been neutralized by calcium or magnesium oxide, pasteurized and inoculated with a desirable lactic acid producing organism. The organisms are permitted to grow until the milk coagulates, at which time it will have an acidity between .85 and 1.00 as measured by the Nafis acidity tester. I have found that by adding a cultured starter, as described, that much less rennet may be employed and yet obtain the same setting time of from 25 to 35 minutes. Between 1 cc. and 1.5 cc. of rennet per one thousand pounds of milk is usually sufficient. Furthermore, a much firmer coagulation will take place. This results in a firmer curd and in less acid in the whey and curd cubes. Imperfect coagulation results in excessive loss of fat and of casein, besides giving a cheese imperfect in texture and body.

The reduced amounts of rennet are of advantage in cheese manufacture since excessive amounts of rennet result in a tough curd.

It will be seen that by adding a lactic acid producing starter to the milk which has been pasteurized and neutralized, I am enabled to produce a standard acid content of a certain definite and desirable type of acid. These initial steps are very important since it reduces cheese manufacture to a common base line so that uniform results may always be obtained.

After coagulation has taken place, the curd is cut to allow the whey to escape from it. The rapidity of the escape of the whey is a function of the curd cube size. The curd should be cut at the proper stage of firmness. Any one of several methods used by cheese makers may be employed to determine the time at which the curd should be cut.

One method is to insert the end of the index finger obliquely into the curd for a distance of half an inch or more, and then slowly raise the finger to the surface. If the curd breaks apart with a clean fracture, and if the whey in the broken fracture is clean and not milky and it does not leave small particles of curd on the finger, the curd is ready to cut.

Another method to determine when the curd should be cut is to lay the back of the hand, including the fingers, on the surface of the curd near the edge of the vat and press the hand gently away from the side of the vat. When the curd will move away from the side of the vat cleanly, leaving no curd particles adhering thereto, the curd is ready to cut.

A rule of thumb employed by some cheese makers is to observe the time elapsing between the adding of the rennet until the first thickening appears. This time is multiplied by two and one-half to give the time for cutting.

In cutting the curd, uniformity of size of curd cubes is desirable. This can be achieved by cutting slowly lengthwise of the vat with a ⅜″ horizontal steel curd knife having sharp edges. After this a transverse cut with a 1/16″ perpendicular wire knife is made. Then a longitudinal cut is made with the same wire knife. Care should be taken not to mash the curd when inserting the curd knives, or when turning the curd knives at the end of the vat. The curd knives should be inserted at a 45° angle and drawn back to the end of the vat in perpendicular position.

With my method of cheese making, the curd cubes are much firmer and can be cut into much more uniform cubes than is usually the case with the methods of the prior art. I find my curd cubes will not harden as rapidly and the expulsion of the whey is more uniform. This results in a gradual and uniform hardening or contracting of the cubes. The rapidity at which the curd cubes contract determines the time when heat should be applied. In the methods of the prior art it is customary to wait for the development of acid in the whey. In my method no attention is given to acid development in the whey. The curd is sufficiently firm, the temperature is raised slowly to between 98° F. and 100° F., raising the temperature about 2° every 5 minutes.

In the prior art, the heating is dependent upon the acidity of the whey. For example, if after cutting the whey showed an acidity of .12 percent, 60 minutes was allowed for heating. This period was reduced as the acidity was increased. When the acidity was as high as .15 per cent, 20 minutes was allowed in the prior art for heating.

In my method a uniform acidity may be achieved from day to day, time after time, producing a uniform product by a uniform and standard method.

In my method the whey will have considerably less acidity than is present in the milk before the addition of rennet. This is due to the fact that the whey contains no casein. A too rapid application of heat hardens the outside of the curd and prevents the escape of whey. The acid in the curd develops from the lactose and if too much whey is retained in the curd, a sour cheese results.

There are several rules of thumb which may be employed to show when the whey should be removed from the curd. When the curd cubes are contracted to less than one-half of their original size, they should be firm and resilient so that when a mass of curd is pressed between the hands and suddenly freed from pressure, the pieces should fall apart at once and show no tendency to adhere.

The hot iron test is a good test of ascertaining when to remove the whey from the curd. About two feet of one inch iron pipe is heated. A handful of curd is squeezed in a dry cloth until the surface has been well dried. The curd is then gently pressed against the portion of the pipe which is hot enough to make the curd stick to the pipe, but not hot enough to scorch. The curd is then taken from the hot pipe and if the curd is in proper condition, it will produce find silky threads.

The next step is the cheddaring of the curd, which is the distinctive feature in making hard cheese such as Cheddar cheese. As soon as the whey has been drawn from the curd cubes and they are sufficiently dry, they should be piled up evenly along two sides of the vat, leaving an open channel four to six inches in width. Some cheese makers prefer to pile the curd cubes on racks. The temperatures should be kept about the same as the temperature used in cooking the curd cubes in whey.

If the curd becomes matted into a solid mass, it should be cut into blocks about six to eight inches in length and turned over. It takes about 15 or 20 minutes for each piling. If the curd contains excessive amounts of visible free whey, the narrow block should be cut and turned over every 10 minutes. The operation may be hastened by piling strips of curds three or four layers deep as the process of matting proceeds.

The cheddaring or matting process should be continued until the hot pipe test will give long silky threads about one and one-quarter to one and one-half inch in length. The object of the cheddaring step is to obtain the proper texture of the curd, which will tear apart like the breast meat of a roasted chicken, and be velvety in appearance and touch.

When the cheddaring process is complete, the curd is ready to mill or cut. The purpose of the milling operation is to cut the curd slabs into small cubes of uniform size in order that the curd may be salted and handled more easily during the balance of the process. Any suitable curd mill known to the art may be employed. After milling the curd cubes are scattered over the bottom of the cheese vat and exposed to air, permitting gases to escape. The curd cubes should be stirred during this step by curd forks to keep the curds from rematting.

At this stage in the process, the curd will smell like toasted cheese when rubbed on a hot iron. A hot pipe test will produce silky threads from one-half inch to three-quarters inch in length.

If the curd is too acid, the hot pipe test will give silky threads from one and one-half inches to two inches in length. The acidity should be reduced by making a slurry of magnesium oxide or calcium oxide and water and scattering the slurry over the curd cubes, stirring them well from time to time, thus reducing the acidity of the curd cubes.

The curd is then salted. About 2 to 3 percent of salt per thousand pounds of milk used is a good average to employ. The salt should be sprinkled evenly over the surface of the curd cubes. Too much salt makes the cheese mealy due to a loss of moisture which makes the cheese cure slowly. A good quality mellow Cheddar cheese will contain very little salt as most of the salt will be pressed out and expelled when the curd is pressed in hoops.

After salting the curd should feel mellow and silky and it is then ready to be pressed in the hoops. The object of pressing the curd is to give the cheese convenient form for handling and a definite characteristic shape for marketing, as well as to squeeze out some additional whey, avoiding an excess of moisture. Most of the excess whey, however, will have been removed while the curd is in the vat.

After the curd has been subjected to the pressure for 45 to 60 minutes, the curd will become a solid mass and is ready for dressing. After the cheeses are dressed they are stored for curing and ripening.

It will be seen that I have accomplished the objects of my invention. By standardizing the milk and giving it the desired acidity with a predetermined medium, I am enabled to produce a uniform quality of cheese having a known desirable flavor, and do not have to depend upon the haphazard fermentation or souring which has been permitted by the prior art, and in which many undesirable and unknown factors are present.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, I claim:

1. A method of making cheese including the steps of pasteurizing milk, neutralizing the milk with an agent selected from a class consisting of calcium oxide and magnesium oxide, adding a lactic acid producing starter to the milk, coagulating the milk with a coagulating agent, cooking the curd, cutting the curd, cheddaring the curd, milling the curd, salting the curd, pressing the curd, and then dressing the cheese.

2. A method as in claim 1 in which said starter comprises milk which has been neutralized by means of an agent selected from the class consisting of calcium oxide and magnesium oxide inoculated with a desirable lactic acid producing organism and permitted to coagulate by the lactic acid produced by said organism.

3. A method as in claim 1 in which said coagulating agent is rennet.

4. A method as in claim 1 in which said coagulating agent is rennet and in which said rennet is added in amounts between 1 cc. and 1.5 cc. per thousand pounds of milk.

5. A method as in claim 1 in which the acidity of the curd is reduced during the milling step by means of an agent selected from the class consisting of calcium oxide and magnesium oxide.

6. A Cheddar cheese made by a process which includes the steps of pasteurizing milk, neutralizing the milk with an agent selected from the class consisting of calcium oxide and magnesium oxide, adding a sufficient amount of lactic acid producing starter to bring the milk to the desired acidity, coagulating the milk with rennet, cooking the curd, cutting the curd, cheddaring the curd, milling the curd, salting the curd, and then pressing and dressing the cheese.

7. In a cheese making process, the steps of pasteurizing milk, neutralizing the milk with an agent selected from the class consisting of calcium oxide and magnesium oxide, adding a lactic acid-producing starter to the milk, and coagulating the milk with a coagulating agent.

ERNEST D. FEAR.